(12) United States Patent  
Honhart

(10) Patent No.: US 7,751,451 B2  
(45) Date of Patent: Jul. 6, 2010

(54) SYSTEMS AND METHODS FOR ANALOG CHANNEL REUSE IN A CABLE SYSTEM

(75) Inventor: Jon Honhart, Evergreen, CO (US)

(73) Assignee: Tandberg Television Inc., Duluth, GA (US)

( * ) Notice: Subject to any disclaimer, the term of this patent is extended or adjusted under 35 U.S.C. 154(b) by 965 days.

(21) Appl. No.: 11/531,900

(22) Filed: Sep. 14, 2006

(65) Prior Publication Data

US 2008/0069155 A1    Mar. 20, 2008

(51) Int. Cl.
  *H04J 3/04*   (2006.01)
  *G06F 13/00*  (2006.01)
  *H04N 7/173*  (2006.01)

(52) U.S. Cl. .................... 370/535; 725/59; 725/105

(58) Field of Classification Search ............... 725/59, 725/105, 109, 114–117, 132, 135, 138, 140, 725/143, 144, 146
See application file for complete search history.

(56) References Cited

U.S. PATENT DOCUMENTS

| | | | |
|---|---|---|---|
| 5,515,511 A * | 5/1996 | Nguyen et al. | 725/117 |
| 6,678,733 B1 * | 1/2004 | Brown et al. | 709/229 |
| 6,868,550 B1 * | 3/2005 | Hashimoto | 725/25 |
| 7,151,782 B1 * | 12/2006 | Oz et al. | 370/468 |
| 7,269,841 B1 * | 9/2007 | Hendricks et al. | 725/94 |
| 2005/0125841 A1 * | 6/2005 | Helms et al. | 725/118 |
| 2005/0193415 A1 * | 9/2005 | Ikeda | 725/49 |
| 2006/0107302 A1 * | 5/2006 | Zdepski | 725/135 |
| 2006/0242315 A1 * | 10/2006 | Nichols | 709/231 |

\* cited by examiner

*Primary Examiner*—Ricky Ngo  
*Assistant Examiner*—Clemence Han  
(74) *Attorney, Agent, or Firm*—Alston & Bird LLP

(57) ABSTRACT

A system and method is disclosed allowing a cable network provider to dynamically allocate a network resource, in the form of channel bandwidth, for conveying either analog or digital assets. Certain assets are distributed in a cable network in an analog manner but only during certain time periods. The network resources could be used for offering digital services at other times. A programmable RF switch allows network resources to be switched to convey digital assets when the analog channels are not required. The digital assets conveyed may comprise movies, games, or music and can be transferred during 'off-hours' for local storage in the set top box in anticipation of future requests by a user. When the asset is requested, the set top box first checks if the asset is locally available, and if so, spools it out locally.

18 Claims, 2 Drawing Sheets

SYSTEMS AND METHODS FOR ANALOG CHANNEL REUSE IN A CABLE SYSTEM

FIELD OF THE INVENTION

Figure 1:
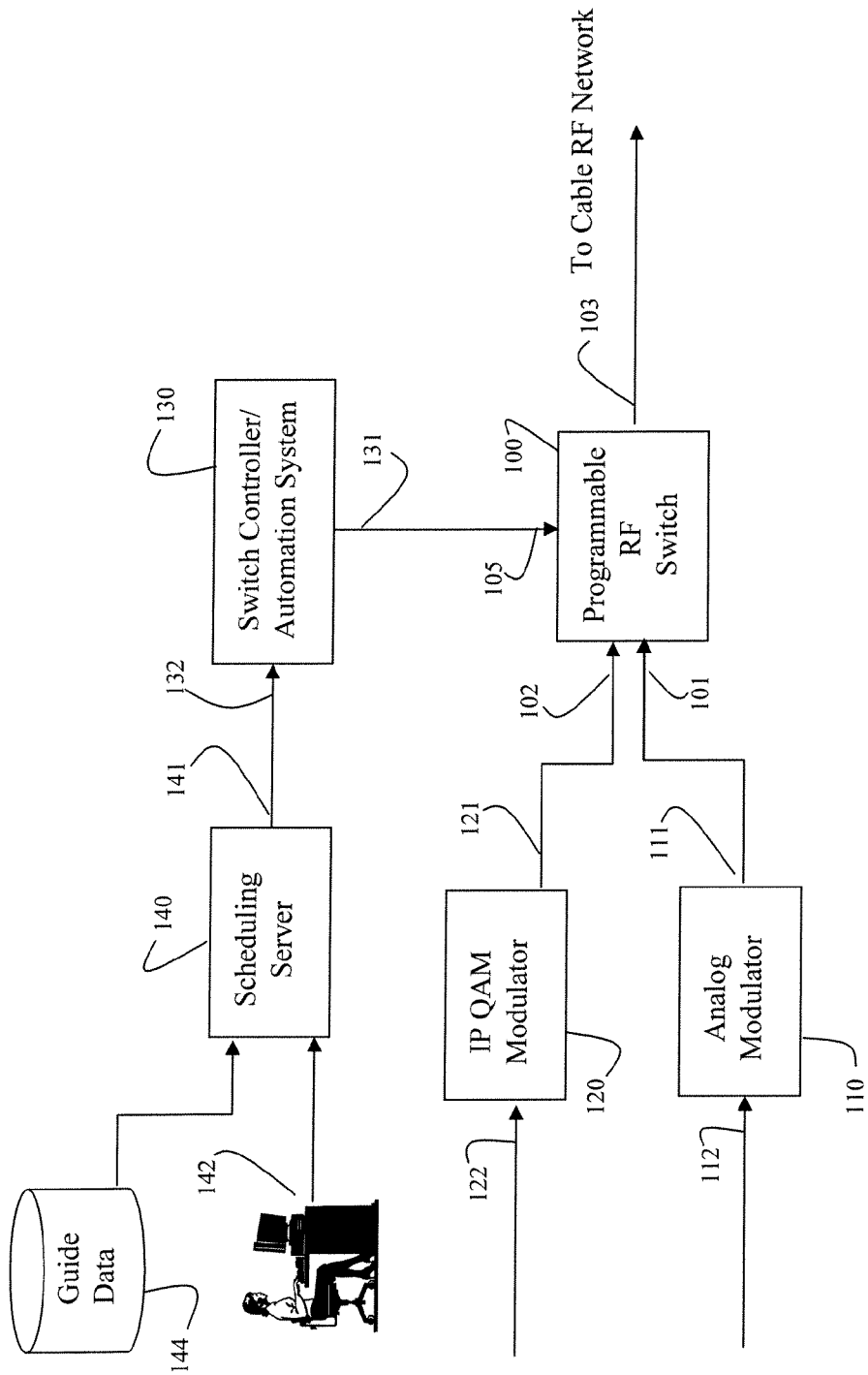

The invention generally pertains to systems and methods for allocating transmission resources in a cable system; specifically allocating transmission bandwidth in a cable system for conveying analog or digital channels, as well as using the digital channel for conveying digital assets for future viewing or use by a user.

BACKGROUND OF THE INVENTION

The development and deployment of digital transmission technology in cable networks has increased the number of channels that can be conveyed on a cable network. The allocated bandwidth, or spectrum, in the transmission system can provide more digital channels than if used to convey analog channels. Other benefits accrue from using digital channels as well, including offering new types of services which are not possible using analog channels. However, for various reasons, there is a need to allocate some of the cable's network resources for analog channels. Until such time that cable networks migrate and are 100% digital, analog channels will remain allocated or may be required to be allocated, thus representing a less than optimum use of resources for the cable operator.

In the past, certain analog channels were allocated for conveying certain types of programming, even if the programming was provided only for limited times during the day. For example, many cable systems are required to provide certain public, education, and governmental (PEG) programs, which may be analog in form or may be required to be transmitted in analog because the source was provided in that format. However, the programming may be produced and available only for a few hours of the day (e.g., 7 a.m. through 12 noon). In such cases, the analog channels are available for other uses at the other times. Rather than not provide any programming at all, cable operators sell access during the unused time for programming known as "infomercials." Infomercials are privately produced programs selling a product or service, and typically are much longer in duration than typical commercials. Thus, an infomercial can be used to fill up a block of time (e.g., a 30 minute time block). While this type of programming is typically not as profitable for a cable operator, this may be the only alternative for use of the analog channel, which may otherwise go unused.

Thus, systems and methods are needed for allowing a cable operator to better use cable network resources. Specifically, analog channels need to be provided for certain time periods, but should not be limit the cable operator from offering other services.

SUMMARY OF INVENTION

In one embodiment, the invention comprises an analog modulator configured for receiving an analog channel signal as an input and providing a modulated analog channel signal as a first output signal, an Internet Protocol Quadrature Amplitude Modulator ("IP QAM") modulator capable of receiving digital signals as an input and providing digital IP QAM signals as a second output signal, a programmable RF switch capable of receiving the first output signal and the second output signal, the programmable RF switch providing a third output signal for distribution over the cable network, wherein the third output signal comprises either the first output signal or the second output signal according to a control signal received as an input to the programmable RF switch; and an automated switch scheduling system providing the control signal, the automated switch scheduling system receiving program guide data defining a schedule used in generating the control signal so as to cause the programmable RF switch to switch the second output signal to the output at certain times according to the schedule wherein the automated switch scheduling system comprises a scheduling server providing a first control signal and an indication of a channel identifier associated with the analog channel and a switch controller receiving the first control signal and the indication of the channel identifier causing the switch controller to generate the control signal to the programmable RF switch.

In another embodiment, the invention comprises a method for providing channel reuse in a cable network comprising the steps of providing a program guide schedule to an scheduling server, the program guide schedule defining specific time periods of the availability of a first program, processing the program guide schedule in the scheduling server in conjunction with commands from an operator indicating certain time periods associated with the program guide schedule so as to provide so as to provide a command signal to a switch controller indicating the certain time periods to the switch controller, providing a control signal from the switch controller to one of a plurality of programmable RF switches, and receiving the control signal at the programmable RF switch having a first input and a second input, wherein the second input is an IP QAM signal associated with a digital asset, the control signal indicating selecting of the second input at the programmable RF switch for generating a third output signal.

BRIEF DESCRIPTION OF THE SEVERAL VIEWS OF THE DRAWING(S)

Figure 2:
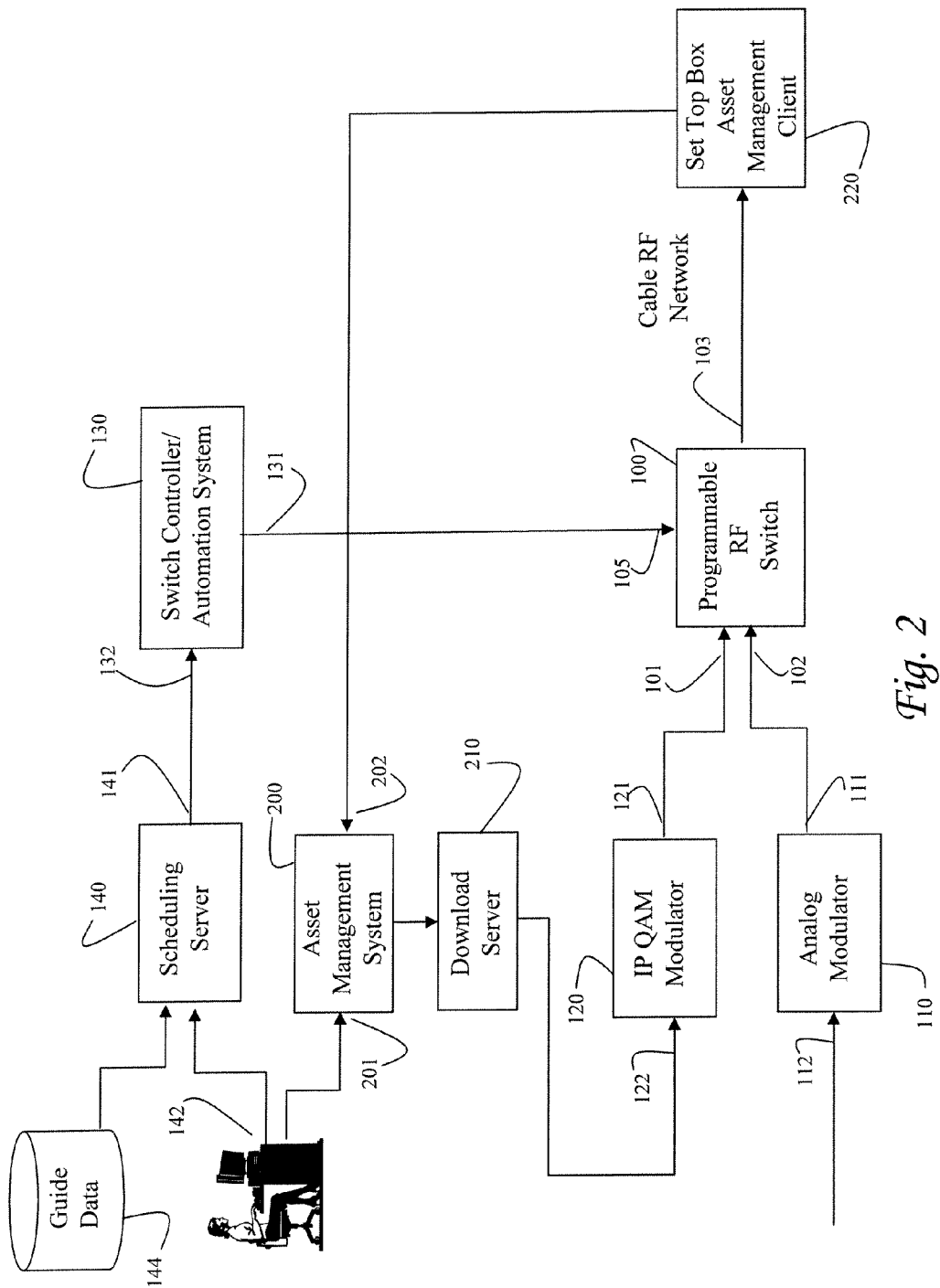

Reference will now be made to the accompanying drawings, which are not necessarily drawn to scale, and wherein:

FIG. 1 illustrates one embodiment of the present invention illustrating possible components that can be used for analog/digital channel switching; and FIG. 2 illustrates one embodiment of the present invention illustrating possible components that can be used for providing services using a channel allocated for digital services.

DETAILED DESCRIPTION OF THE INVENTION

Various embodiments of the present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to which these inventions pertain in light of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Currently, cable operators may provide analog channels on their cable networks on a permanent basis in order to accommodate certain types of programming. For example, many cable systems are required to provide programs pertaining to public, educational, or governmental (PEG) activities. The PEG programs are typically transmitted using analog channels so that any user, even without a set top box, can view the programs. Typically, a cable operator will allocate the transmission bandwidth for conveying analog channels even if only the analog programs are provided for a portion of the day. Similarly, other types of analog channels may be reallocated for other programming during certain types of the day. Another example are sports channels, which are dedicated to presenting various sporting events, but are limited to the times of the day, and day of the week, in which sports events are being broadcasted, or when sports viewers are likely to be available. Thus, sports channels may have regular time periods during the week in which the channels is used for other purposes.

However, dedicating cable network resources for analog channels is not the most efficient use of resources. Typically, when PEG programs are not being transmitted, the analog channels are reused for other programs, such as infomercials. Typically, analog channels carry infomercials during certain hours (typically, the 'off hours'). From a cable operator's perspective, providing infomercials may not be as profitable as providing other programming, but this represents revenue which would otherwise not be realized. However, there are higher and better uses for the cable resources, which could be realized if the analog channels were not statically allocated for conveying analog programs.

According to one embodiment of the present invention, the channels (or spectrum) are dynamically allocated for analog channels during certain time periods and then reallocated for conveying digital assets (e.g., programs including movies, games, music) during other time periods.

The cable system provider determines, based on various inputs, when to allocate cable network resources for analog channels and when to allocate the cable network resource for digital services. The reallocation of the resource is accomplished via a programmable switch, which can select from among one of two inputs. (Other embodiments may select from among several inputs, but the above embodiment is sufficient to illustrate the principles of the present invention.) The programmable switch, (also known as a programmable A/B switch or programmable RF switch) is well known in the art.

As shown in FIG. 1, the programmable RF switch 100 has an input 101 which accepts analog modulated signals. These analog signals are generated as the output of an analog modulator 110. The analog modulator in turn receives via an input 112 an analog program channel and generates analog modulated signals on its output 111 that is the input to the programmable RF switch 100. Likewise, the programmable RF switch 100 also receives another input 102, but which is not analog in form. Rather, the input 112 is an Internet Protocol Quadrature Amplitude Modulation ("IP QAM") modulated signal 121 generated from an IP QAM modulator 122. The IP QAM modulator 120 receives its input in the form of digital signals 122 that may be encoded in various forms and conveying digital assets.

As used herein, "digital asset" refers to any type of product that can be conveyed using digital signals, and may be video based (e.g., a movie on demand or game), or other some other form (such as music, advertisements, software, etc.).

The programmable RF switch 100 basically selects which one of the inputs to pass through to the output 103, which is then distributed on a cable network (not shown). The programmable RF switch selects which input to pass through to the output based on a control signal input 105. The control signal is generated by a switch controller/automation system 130, or simply referred to hereafter as 'switch controller.' The switch controller generates the control signal 105 as an output 131 indicating to the RF programmable switch which input to select for switching.

The switch controller may provide various functions relative to the overall system's operation. The switch controller may be 'tightly coupled' with the programmable RF switch. For example, the switch controller and RF switch may be manufactured by the same vendor and use a proprietary protocol for passing control signals. They could even be integrated into a single component from a vendor. Thus, one function of the switch controller may be to facilitate control of the programmable RF switch by other components (e.g., the scheduling server) that are not able to communicate to the programmable RF switch using the proprietary protocol. In addition, there may be a number of programmable RF switches deployed (not shown in FIG. 1), which are all controlled by a central single switch controller. In this case, the switch controller must receive not only an indication from the scheduling server 140 of what signal should be selected, but information allowing it to identify which switch is being controlled. The switch controller 130 may map an explicit switch identifier (e.g., name or address) to select a particular RF switch 100. Alternatively, the switch controller may be given information regarding a particular analog channel or digital service being controlled (e.g., that a particular program name should be switched). In this case, the switch controller may incorporate the functionality of using the program name or identifier information to determine which of several programmable RF switches or input ports thereof are to be controlled.

As it can be seen, the inputs 132 to the switch controller may vary. In one embodiment, the inputs may identify a particular channel (e.g., a specific analog PEG channel) which should be switched through for distribution on the cable network. This requires the switch controller 130 to recognize the channel identifier (whether the identifier indicates a name, number, or other identifier). Thus, in one embodiment, the switch controller may receive an input, e.g., "Switch On (PEG x)" meaning that a particular PEG channel ("x") should be switched through. The switch controller 130 receives the command, and via a memory table, database, or other means, determines which programmable RF switch 100 is associated with the input PEG x, and then sends the appropriate control signals 105 instructing the RF switch to select the appropriate input for switching. Typically, it is implicit that switching one of the inputs through the switch automatically disconnects any other input from being switched through the switch. The switching of the RF switch typically occurs contemporaneously with the provision of the input signal, although in other cases the input signal may be provided prior to the control signal instructing the RF switch to select the input signal.

The scheduling server 140 provides a graphical user interface (GUI) for operations and administrative personnel 142 to interact with. The scheduling server generates the appropriate commands 141 to the switch controller. If multiple programmable RF switches are involved, or if multiple switch controllers are involved, the scheduling server may have a topology of the network architecture facilitating the user's control of the various switches. The commands generated by the scheduling server may conform to an application programming interface (API) defined by the switch controller manufacturer.

The scheduling server 140 also receives guide data 144, which is typically in a digital file format. This may be received from remote servers operated by third parties, or downloaded into local systems from third parties. In other embodiments, the cable network provider can construct their own guide data database. The guide data indicates when a specific program is available and when it is not. Typically, the guide information provides the availability information for a plurality of programs over a number of days. The scheduling server may provide a GUI for allowing the user to easily identify channels and associated times from the guide data for which the analog program is to be distributed, and for the particular times for which a channel is reallocated for providing digital services. The cable operator may chose to override certain programs as indicate in the guide data, which are not desired to be distributed. The scheduling server may also contain other information, such as rules for which programs must be provided, are optional, which channels they normally are broadcasted on, how to identify the various programmable switches and their input ports, etc. Thus, the application driving the GUI and the application reading the guide data are capable of providing the necessary information to the scheduling server for issuing the appropriate commands to the switch controller. Once the appropriate programs and times are defined, the switch controller commands the programmable RF switch to select the analog channel input or the digital asset input for distribution on the cable system.

The above system represents one embodiment of the invention that allows a resource on the cable network, specifically a bandwidth channel, to be dynamically allocated to convey either an analog program or a digital asset according to a schedule or other rules established by the cable operator. This allows the cable resources to be used more effectively, without having to assign a cable resource to permanently carry an analog channel, when the analog channel is required for only a portion of the time.

Once the channel resource is available for digital services, various types of services can be offered. The services that can be offered may depend, in part, on the times that the channel resource is available. For example, the channel may be used for video-on-demand (VOD) movies (one form of a digital asset). However, it is likely that the times during a day when viewers are requesting VOD asset may not coincide with the times that the channel resource is available for conveying the digital asset. It may be more likely that the channel resource is available for conveying digital assets during 'off-hours,' wherein the numbers of active viewers are relatively low.

However, the network resources may be used for downloading digital assets during 'off-hours' for storage in the set-top-box (STB) for future user viewing. The STB is often enabled to store compressed digital video by means of hard disk storage or other forms of memory. The STB also incorporates the appropriate software for conditioning access to the programs. The STB capability for storing programs may be referred to as a personalized video recorder (PVR) capability. In summary, the STB can be viewed as a "cache" memory for on-demand requests for a digital asset. Downloading digital assets in advance to user's requests avoids encountering resource constraints in the network during peak traffic times. For example, evenings are a likely time for users to request downloading and viewing of a new movie, but by sending the digital asset during the off hours to the STB prior to a user's request, the user's request can be fulfilled by the STB without having to download the asset from the network. Thus, this time-shifting aids in minimizing traffic congestion during times that would otherwise likely be carrying large amounts of traffic.

The digital asset could be a movie, but is not limited to such and can include digitized music, video games, advertising, or yet-to-be-defined services. The network uses the 'off hours' to reconfigure a network resource (e.g., the channel) for allowing digital assets to be transferred and stored on the STB, based on the anticipation that a user will be requesting the asset. In other applications, the digital asset could be digitized music. This would allow a STB to receive a current list of popular music, including new releases. When a user then wishes to view the most recent selections, they will be loaded in the STB ready for playback. Another type of service could perform a similar service for downloading the most recent digital audio broadcasts from radio stations or other news services. This would ensure that if the user wanted to hear the most current news, it would be readily available. In this case, nightly downloads could occur. In summary, any number of applications are possible where digital assets are downloaded to the STB based on the possibility of the user selecting the asset for viewing or playback.

In many cases, the assets stored in the STB comprises the most popular video assets. It is well known that about 90% of the customers requesting a VOD watch only 10% of the titles available. Thus, it is fairly easy to generally predict which assets a VOD user may request.

While storing the 10% of titles may satisfy 90% of the VOD requests, this still may occupy more space in the STB than is available. Another approach is to determine which asset a particular viewer is likely to request, and then download that asset to the STB. This can be accomplished by monitoring the usage or viewing habits of the viewer. The STB typically maintains a record of which types of programs are viewed and when, and by reporting this information from the STB to the cable network, the cable network can further select which programs should be downloaded or "pushed" to the STB. Based on past viewing histories, the STB could inform the cable network of the user's viewing habits, including the rating of the program, the nature of the program, etc. The STB could report back to the cable network using standardized rating labels associated with the programs (e.g., rating information), and/or the types of programs (e.g., comedy, drama, etc.), or program identifiers. Alternatively, specific information regarding which titles or channels that were selected at which times could be provided to the network, where a system in the network analyzes the viewing habits of the user. Thus, a variety of ways can be used for reporting which programs are viewed. Once the viewing habits are known, programs that are likely to be selected by the viewer can be "pushed" during "off hours" using the allocated channel. This approach would require a STB asset management client able to interact with a network server for polling, or retrieving the user's viewing information so as to select a likely program or digital asset to download.

The network may maintain a user profile of programs viewed by a particular STB. This would be periodically updated to "learn" the current preferences of the viewer. The network would then determine which programs fit the profile for a viewer, and then download them to the STB in anticipation of the user requesting the video asset.

The network may further provide commands, known as download commands, to a particular STB, which function to instruct the STB to copy a particular program being downloaded. This could be coupled with various conditional access schemes so that only authorized terminals could store and playback a digital asset for authorized viewers. Specifically, a premium channel could be 'pushed' to a STB to be recorded only for those viewers that have subscribed to such service. Further information can be found in U.S. patent application Ser. No. 11/278,242, filed Mar. 31, 2006, entitled Systems and Methods for Distributing Software to a Host Device In A Cable System, the contents of which are incorporated by reference into the present application.

The storage of an asset in a STB does consume resources in the STB, which are limited. Various mechanisms could be defined for managing the storage of digital assets. For example, if a video asset is not viewed within a certain time period (e.g., four weeks), it could be automatically erased by the STB. Alternatively, the video asset could be stored until capacity was depleted (or a certain percentage thereof), at which point the video asset would be erased on a first in-first out basis (e.g., oldest is erased first). The storage of the video asset can be in various types of memory in the STB, including RAM memory, hard disk memory, or other forms. In general, "memory" is not intended to be dependent on a particular type of technology.

The network architecture for enabling the "push" of digital assets is shown in FIG. 2. Since many of the same components are present as were previously discussed in FIG. 1, these components are not reviewed again. The new components relative to FIG. 1 are the asset management system 200, the download server 210, and the asset management client 220.

The asset management system 200 is responsible for determining which video assets are downloaded to a STB. Typically, this occurs via commands entered in by administrative personnel via input 201, as well as usage information received via input 202 that originated from the STB 220. The asset management system selects the appropriate asset from a plurality of assets, and provides the asset and the information to the download server 210 including information as to when and to whom the video asset should be sent to. The download server then spools out the asset at the appropriate time. This is accomplishing by spooling the asset to the IP QAM 120, which in turn, provides the digital asset to the programmable RF switch, which in turn distributes the asset to the cable network.

The STB incorporates an asset management client 220 that maintains information regarding digital assets viewed by a user. This information may be determined based on usage information obtained from the STB, and the asset management client in the STB may be periodically polled by the asset management system, or may be autonomously sent by the STB to the cable network headend, where it is analyzed by the asset management system.

When a user requests a particular video asset, the STB first checks which assets have already been downloaded. If the asset is already present in the STB, the set top box does not have to request downloading of the asset from the network. In some embodiments, the STB may indicate to the cable provider that a viewer request has been made so as to ascertain whether the user is authorized for viewing the asset or determining the appropriate charge for viewing the asset. In other embodiments, the set top box may received a command instructing the set top box to copy the digital asset, so that storage of the asset in memory implies that the user is authorized without requiring the set top box request explicit authorization. Various schemes are possible for ensuring that only authorized viewers can access the digital asset. Further once the asset has been viewed, the asset management client in the set top box notes that the asset has been viewed, and may report this according to the previously defined mechanism to the asset management system. The STB may then discard the asset (e.g., erase it from memory) at that point, either under its own control, or as directed by the cable network.

That which is claimed:

1. A system for providing channel reuse in a cable network comprising:
    an analog modulator configured for receiving an analog channel signal as an input and providing a modulated analog channel signal as a first output signal;
    an Internet Protocol Quadrature Amplitude Modulator ("IP QAM") modulator capable of receiving digital signals as an input and providing digital IP QAM signals as a second output signal;
    a programmable RF switch capable of receiving the first output signal and the second output signal, the programmable RF switch providing a third output signal for distribution over the cable network, wherein the third output signal comprises either the first output signal or the second output signal according to a control signal received as an input to the programmable RF switch; and
    an automated switch scheduling system providing the control signal, the automated switch scheduling system receiving program guide data defining a schedule used in generating the control signal so as to cause the programmable RF switch to switch the second output signal to the output at certain times according to the schedule wherein the automated switch scheduling system comprises:
    a scheduling server providing a first control signal and an indication of a channel identifier associated with the analog channel and
    a switch controller receiving the first control signal and the indication of the channel identifier causing the switch controller to generate the control signal to the programmable RF switch.

2. The system of claim 1 wherein the programmable RF switch is one of a plurality of programmable RF switches controlled by the automated switch scheduling system.

3. The system of claim 1 further comprising:
    an asset management system comprising a plurality of digital assets for distribution over the cable network; and
    a download server capable of receiving one of the plurality of digital assets and spooling one of the plurality of digital assets according to a schedule by providing digital signals to the IP QAM modulator at the certain times.

4. The system of claim 3 wherein the asset management system receives usage statistics from a set top box that are used to identify the set top box for receiving a download command to copy the one of the plurality of digital assets into memory of the set top box.

5. The system of claim 1 wherein the download server provides the digital signals to the IP QAM modulator with the provision of the control signal to the programmable RF switch for selecting the second input signals at the certain times.

6. The system of claim 5 wherein the one of the plurality of digital assets is a video movie asset that is received and stored in a set top box for subsequent viewing.

7. The system of claim 6 further wherein the set top box is connected to the cable network and has not yet sent a request for the video movie asset.

8. The system of claim 1 wherein the third output signal is provided on a cable network after a download command has been set to a set top box instructing the set top box to copy into its memory the third output signal.

9. A method for providing channel reuse in a cable network comprising:

providing a program guide schedule to an scheduling server, the program guide schedule defining specific time periods of the availability of a first program;

processing the program guide schedule in the scheduling server in conjunction with commands from an operator indicating certain time periods associated with the program guide schedule so as to provide so as to provide a command signal to a switch controller indicating the certain time periods to the switch controller;

providing a control signal from the switch controller to one of a plurality of programmable RF switches; and receiving the control signal at the programmable RF switch having a first input and a second input, wherein the second input is an IP QAM signal associated with a digital asset, the control signal indicating selecting of the second input at the programmable RF switch for generating a third output signal.

10. The method of claim 9 further comprising the steps:

selecting a video asset as the digital asset from an asset management system and providing the video asset and a distribution schedule to a download server; and spooling the video asset to an IP QAM modulator for generating the second input signal to the programmable RF switch, thereby resulting in the video asset being distributed over a cable network.

11. The method of claim 10 wherein the generating of the second input signal to the second input of the programmable RF switch occurs with the switching of the programmable RF of the second input to an output of the programmable RF switch.

12. The method of claim 10 wherein the video asset represents a video movie asset which is received and stored by a set top box on the cable network.

13. The method of claim 12 further comprising the step of:
transmitting a download command to the set top box causing the set top box to copy the video asset distributed on the cable network.

14. The method of step 12 further comprising the steps of:
receiving at the set top box a request for the video asset from a user;
determining that the video asset is stored in the set top box;
determining that the set top box is authorized for allowing viewing of the video asset; and
causing the video asset to be transmitted from the set top box to a television for viewing by the user.

15. The method of claim 10 further comprising the steps of:
receiving usage statistics from a set top box;
determining a characteristic of the digital asset; and
sending a download command to the set top box based on the characteristic of the digital asset and the usage statistics.

16. The method of claim 15 wherein the digital asset is a game.

17. The method of claim 10 further comprising the step of:
selecting the programmable RF switch to provide the control signal wherein the programmable RF switch is one of a plurality of programmable RF switches and wherein the selection of the one of the plurality of programmable RF switches is based on the digital asset.

18. The method of claim 17 wherein the digital asset conveys a music program.

* * * * *

UNITED STATES PATENT AND TRADEMARK OFFICE
CERTIFICATE OF CORRECTION

PATENT NO. : 7,751,451 B2
APPLICATION NO. : 11/531900
DATED : July 6, 2010
INVENTOR(S) : Honhart It is certified that error appears in the above-identified patent and that said Letters Patent is hereby corrected as shown below:

In the drawings:

Fig. 2, Sheet 2 of 2, delete " 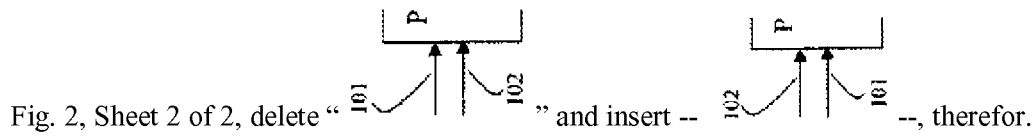 " and insert -- -- , therefor.

In Column 2, Line 24, after "provide" delete "so as to provide".

In Column 8, Line 59, in Claim 7, after "claim 6" delete "further".

In Column 9, Line 8, in Claim 9, after "schedule" delete "so as to provide".

In Column 9, Line 20, in Claim 10, delete "steps:" and insert -- steps of: --, therefor.

In Column 10, Line 8, in Claim 14, delete "step" and insert -- claim --, therefor.

Signed and Sealed this
Twenty-ninth Day of March, 2011

David J. Kappos
*Director of the United States Patent and Trademark Office*